United States Patent [19]

Duncan

[11] Patent Number: 4,917,135
[45] Date of Patent: Apr. 17, 1990

[54] LIQUID LEVEL REGULATOR DEVICE

[75] Inventor: Malcolm Duncan, Barberton, South Africa

[73] Assignee: Magnetrol International, Downers Grove, Ill.

[21] Appl. No.: 314,488

[22] Filed: Feb. 23, 1989

[30] Foreign Application Priority Data

Feb. 29, 1988 [ZA] South Africa .............. 88/1422

[51] Int. Cl.⁴ .................. H01H 35/18; H01H 35/02; F16K 33/00
[52] U.S. Cl. ..................... 137/2; 73/322.5; 137/386; 200/61.52; 200/81.6; 200/84 R; 200/230; 200/517; 417/40
[58] Field of Search ............ 137/386, 292, 409, 425, 137/434, 1, 2; 73/318, 322.5; 200/61.51, 81.6, 81.9 HG, 84 R, 190, 220, 230, 277, 517; 417/40

[56] References Cited

U.S. PATENT DOCUMENTS

| | | | |
|---|---|---|---|
| 1,855,581 | 4/1932 | Meade | 200/61.52 |
| 2,588,667 | 3/1952 | Stutzman | |
| 2,600,659 | 6/1952 | Koch, Jr. | |
| 3,393,283 | 7/1968 | Lenning | |
| 3,483,341 | 12/1969 | Reichensperger | 200/84 R |
| 3,746,035 | 7/1973 | Singer | 200/84 R |
| 3,944,770 | 3/1976 | Pepper | 200/84 R |
| 4,086,457 | 4/1978 | Niedermeyer | 200/84 R |
| 4,171,186 | 10/1979 | Chapman | 417/40 |
| 4,262,216 | 4/1981 | Johnston | 200/84 R |
| 4,302,641 | 11/1981 | Johnston | 200/84 R |
| 4,373,155 | 2/1983 | Dola | 200/84 R |
| 4,399,338 | 9/1983 | Jones | 73/318 |
| 4,540,891 | 9/1985 | Keener et al. | 200/84 R |
| 4,575,597 | 3/1986 | Akhter | 200/84 R |
| 4,629,841 | 12/1986 | Riback et al. | 200/84 R |
| 4,644,117 | 2/1987 | Grimes et al. | 200/61.52 |

FOREIGN PATENT DOCUMENTS 1273216  7/1968  Fed. Rep. of Germany .... 200/84 R
2528996 12/1983  France .

Primary Examiner—George L. Walton
Attorney, Agent, or Firm—Ladas & Parry

[57] ABSTRACT

A liquid regulator device has a buoyant body which is anchored to a side of the vessel by an electrical conductor. The body contains a movable ballast in the form of a ball and an attitude sensitive switch connected to the electrical conductor. The buoyant body floats in the liquid with one end in the uppermost position. Changing the liquid level tensions the electrical conductor causing the body to tumble. When the body has tumbled through a predetermined angle, the ballast moves from one end of the body to the other to cause the body to rapidly assume the reverse orientation. This causes the attitude sensitive switch to change state, which is used to control the liquid level.

22 Claims, 2 Drawing Sheets

LIQUID LEVEL REGULATOR DEVICE

BACKGROUND OF THE INVENTION

This invention relates to a liquid level regulator device of the kind used to control the level of a liquid such as water in a storage tank, sump or other type of container.

A liquid level regulator device is known which comprises a tear drop shaped plastic body which is selectively weighted according to the specific gravity of the liquid in which it is to be used. The above device is used in pairs, and two regulator devices are in use suspended from electrical cables which are supported vertically above the tank or container for the liquid. The devices are hung at different heights, corresponding to desired maximum and minimum liquid levels. When each device is free of the liquid, it hangs vertically. When the liquid level rises sufficiently to substantially submerge the device, it tilts, actuating an attitude sensitive switch within the housing of the device. The switching action is used to actuate a pump controller or other liquid level control device. Using this arrangement, a pump may be activated to fill the container when the liquid level drops to a predetermined minimum level and the pump may be deactivated when the level reaches a predetermined maximum level.

The known device does not float in the water, but is arranged so that its base portion is more buoyant than its neck portion, which causes a tilting action of the device when submerged. However, the effect of this arrangement is that the switching action of the device is rather sluggish, and a positive switching action may not be obtained, particularly when there is a degree of turbulence in the liquid.

A disadvantage of the above arrangement is that the regulator device, when in the process of being submerged, reaches an intermediate stage between the vertical on the one hand and fully tilted on the other hand wherein the switching mechanisms within the device tends to open and close a few times intermittently. This is highly undesirable since this causes the pump motor to be switched on and off and can accordingly cause damage to the motor. This situation is usually aggravated where the devices are used in industrial or mining applications where the liquid in the tank remains turbulent.

SUMMARY OF THE INVENTION

It is accordingly a general object of the present invention to provide a regulator device which applicant believes will overcome or at least minimize the above problems and disadvantages.

Another object of the invention is to provide a method and apparatus for controlling a liquid level in a vessel.

A further object of the invention is to provide a method and apparatus for controlling the maximum and minimum levels of a liquid in a vessel utilizing a single regulator device.

These and other objects, advantages and features are achieved by a liquid level regulator device comprising:

a float body;

an elongate flexible anchor means attached to a first end of said float body and attachable to an anchor point within a vessel in which a liquid level is to be regulated for anchoring said float body in an orientation with one end of said float body uppermost in said liquid;

a movable ballast within said float body, said ballast being movable between first and second positions near said ends of said float body for tumbling said float body for reversing said orientation in response to tilting said float body by tension on said anchor means produced by changing said liquid level;

an attitude sensitive switch within said float body and responsive to said reversing of said orientation of said float body for controlling a level of said liquid.

Another aspect of the invention includes a method of regulating a liquid level in a vessel comprising:

providing a float body having a first end of an elongate flexible anchor means attached to a first end of said float body, a movable ballast within said float body and an attitude sensitive switch within said float body;

attaching a second end of said anchor to a wall of said vessel at a point between a highest and a lowest level of said liquid, said float body being orientated in said liquid with one end being uppermost in said liquid;

changing a level of said liquid;

tensioning said anchor means for tumbling said body;

moving said ballast from a first to a second position near opposite ends of said float body for reversing said orientation;

reversing a state of said attitude sensitive switch for controlling a level of said liquid.

DESCRIPTION OF PREFERRED EMBODIMENTS

Figure 1:
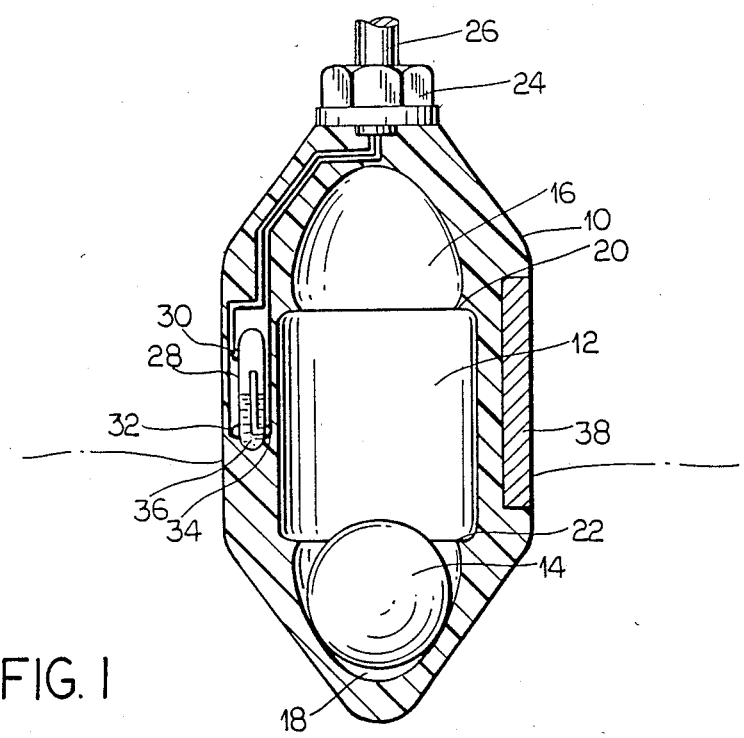
FIGS. 1 and 2 are partial sectional views of a liquid level regulator device according to the invention, showing the device in two different orientations.
Figure 2:
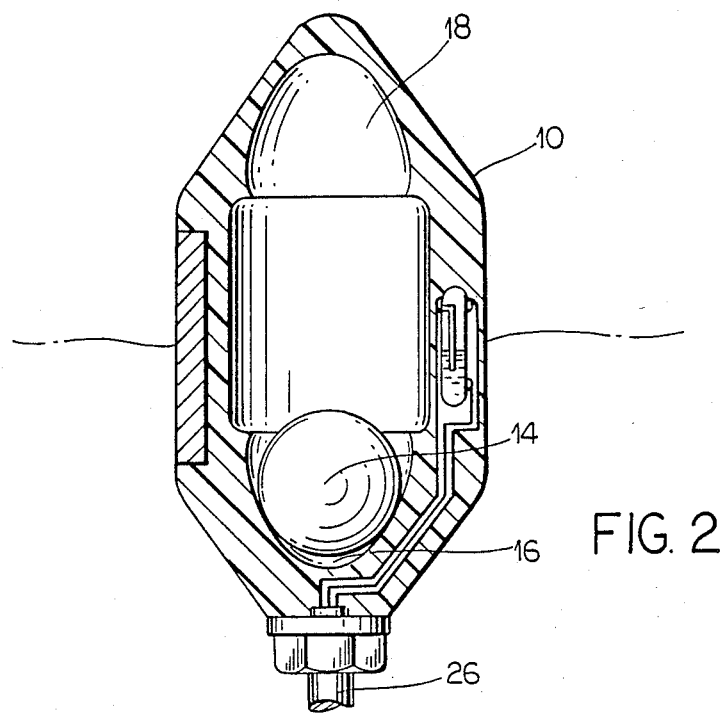

Referring first to FIGS. 1 and 2, the regulator device comprises a hollow plastics float body 10, which has a cylindrical center portion and frustoconical end portions. Internally, the body defines a cylindrical chamber 12 in which a ballast in the form of a relatively heavy steel ball 14 can move freely. At each end of the chamber 12 are roughly hemispherical sockets 16 and 18, the edges of which are defined by respective inwardly extending annular ridges 20 and 22. The inner diameter of the ridges 20 and 22 is slightly greater than the diameter of the ball 14. The ridges are coaxial with the central portion of the body.

At one end of the body 10, a thread is provided onto which is screwed a bush 24. The bush 24 is of the type which includes a sealing gland, and serves to connect an electrical cable 26 in a liquid-impervious manner to the body 10. An attitude-sensitive switch 28 is supported in the wall of the body 10, and has three terminals 30, 32 and 34, to which are connected respective conductors of the cable 26.

The switch 28 is effectively a single-pole double-throw switch, and contains an amount of mercury 36 which either bridges the terminals 32 and 34, or the terminals 30 and 34, depending on the orientation of the body 10. A counterweight 38, conveniently of lead or another relatively heavy metal, is fitted to the wall of the body 10 on the opposite side thereof from the switch 28.

The shape of the annular ridges 20 and 22 is significant in determining the operating characteristics of the device. When the ball 14 is received in either of the sockets 16 and 8, it is effectively cradled by the ridge 20 or 22, and cannot easily roll out of the socket. It is thus necessary that the body 10 be tilted substantially from the vertical before the ball will leave the socket in which it is received. This is important in providing a positive switching action, as will be described below.

Figure 3A:
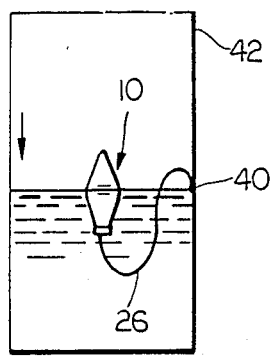
FIGS. 3a to 3f illustrate the operation of the device.

Referring now to FIG. 3, FIG. 3a shows the device of the invention floating in a container 42 of liquid such as water. The electrical cable 26 is fastened to an anchor 40 at one side of the container. The length of the electrical cable 26 is one half of the distance between the maximum and minimum permitted liquid levels in the container, and the anchor 40 is sited midway between these two levels.

Figure 3B:
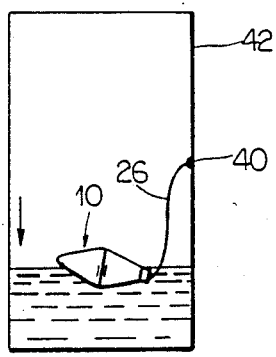
Figure 3C:
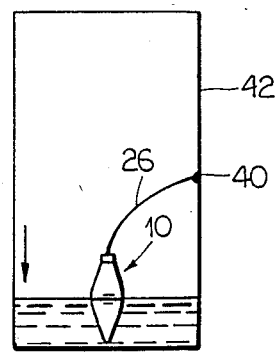

In the position illustrated in FIG. 3a, the device will be oriented as shown in FIG. 2, with the ball 14 resting in the recess 16. In FIG. 3b, the liquid level has dropped to such an extent that the cable 26 is beginning to pull tight, causing the device to begin tumbling. As mentioned above, the ball 14 tends to remain in the recess 16 until the device has rotated through almost 90°. When the critical angle is reached, the ball 14 rolls out of the recess 16 and immediately accentuates the tumbling action of the device as it moves towards the other end thereof. The result is that the device moves rapidly into the position shown in FIG. 3c, where it is once again stable, but inverted relative to its previous orientation. The ball is now received in the socket 18.

As the tumbling action takes place, the mercury 36 in the switch 28 moves to the opposite end of the switch, opening the contacts 32 and 34, and closing the contacts 30 and 34. The operation of these contacts is used to control a pump, valve or other liquid level control apparatus, in a conventional manner, to cause liquid to be pumped into the container.

Figure 3D:
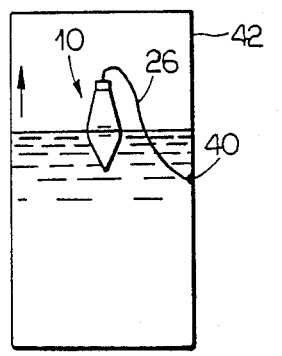
Figure 3E:
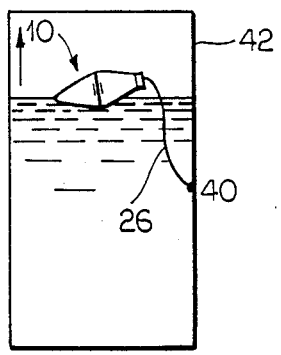
Figure 3F:
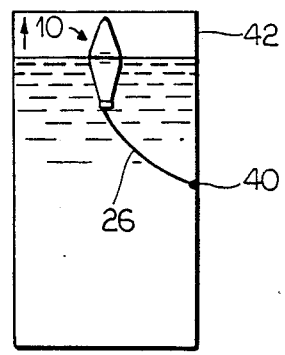

In FIG. 3d, the liquid level in the container is rising, while the device floats stably in its inverted position. In FIG. 3e, the cable 26 is again pulling tight, causing the device to begin tumbling. As the device is rotated by the pull of the cable through 90°, the ball 14 moves from the socket 18 to the socket 16, as described above, causing the device to tumble positively into the position shown in FIG. 3f. This again alters the state of the switch 28, stopping the filling of the container.

The advantages of the described device over the known liquid level controller are immediately apparent. In the first place, a single device can be used to control both the maximum and minimum levels of liquid in a container, whereas two of the prior art devices are required. Secondly, the switching action of the described device is both rapid and positive. Unlike the prior art device, the described device is unlikely to enter an intermediate state in which the contacts of the switch 28 open and close intermittently. This is important, since such intermittent operation of the switch contacts can cause wear or damage to the associated pump or other liquid level control apparatus.

Although the anchorage 40 is illustrated schematically, it will be appreciated that it is important to fix the cable 26 to the side of the container in such a manner as to prevent unnecessary wear thereof. For example, the cable may be passed through a flared gland which accommodates a wide range of angular movement of the cable. Alternately the cable can be fixed to a pivoting support.

Figure 4:
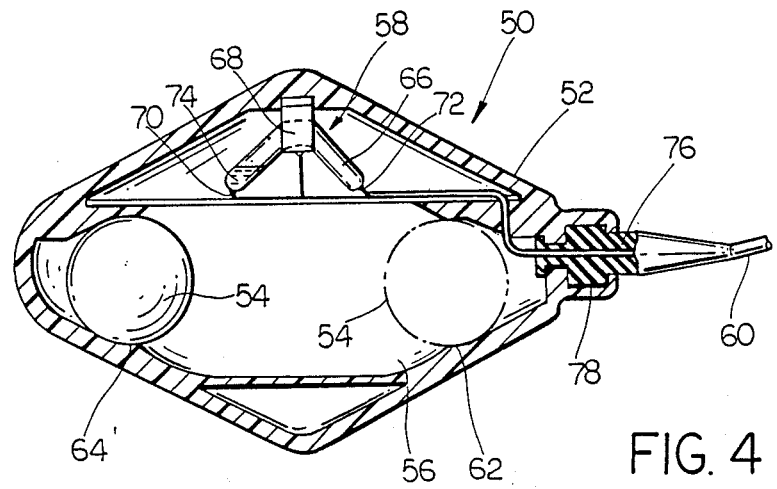
FIG. 4 is a partial sectional view of an alternative embodiments.

Another embodiment of the invention is shown in FIG. 4 in which, a liquid level regulator device 50 comprises a buoyant, plastics float body 52, a movable ballast in the form of a metallic ball 54 movably located in an elongate, essentially cylindrical chamber 56, a mercury attitude sensitive switch 58 and an elongate flexible anchor member in the form of an electrical cable 60 connected at its one end to the mercury switch 58. Chamber 56 further includes two constricted retaining sockets 62 and 64 at its respective ends.

Mercury switch 58 comprises an angled, metal clad or glass tubular body 66 mounted to float body 52 by means of bracket 68, with two electrodes 70 and 72 extending into tubular body 66 at opposite ends thereof. A quantity of mercury 74 is held inside tube 66. The tubular body is preferably angled at substantially 90°.

In use, the leads of cable 60 are connected to electrodes 70 and 72 and to tubular body 66 (i.e., the earth terminal) for metal-clad switches. In the case of glass (nonconductive) body switches, the common lead is connected to the common terminal of the switch.

A molded plastics sealing gland 76 provides a watertight seal around cable 60 where it enters float body 52 through aperture 78.

In use, heavy ball 54 is movable within chamber 56 between the two constricted retaining sockets 62 and 64 across the length of chamber 56. The solid line indicates ball 54 located in socket 62 and the broken line indicates ball 54 located in socket 64. The inner dimensions of retaining sockets 62 and 64 are designed to retain the ball 54 stable in its associated socket until the device 50 reaches an angle of at least 80° from the vertical, whereafter ball 54 rolls across the length of the chamber 56 to the opposite retaining socket, thus providing the positive tumbling action of device 50. It will be noted that as soon as ball 12 leaves its associated socket, its velocity increases due to the effect of gravity as it enters the wider bore of chamber 56 and it gains enough momentum to carry itself into the opposite retaining socket.

It will be appreciated that many variations or modifications of the invention are possible without departing from the spirit of the appended claims. For example, a buoyant float may be attached to the cable a small distance from the float body. This may be useful in very large tanks where the weight of the cable may be sufficient to tilt the device before the required maximum liquid level is attained or where the density of the liquid is too low to support the weight of the device and cable. Other possible variations include the provision of magnets to retain the ballast at the end of the chamber until the predetermined tilting angle is reached. Also, instead of a mercury switch, any other type of attitude sensitive switch may be used, such as a mechanical gravity sensitive switch. The switch may be activated by the moving ballast itself. It should also be noted that the mercury switch shown in FIG. 1, having a straight tubular body may be utilized in the embodiment of FIG. 4. All such changes and modifications can be made without departing from the invention as defined by the appended claims.

I claim:

1. A liquid level regulator device comprising:
   a float body;
   an elongate flexible anchor means attached to a first end of said body and attachable to an anchor point within a vessel in which a liquid level is to be regulated for anchoring said float body in an orientation with one end of said float body uppermost in said liquid;

a movable ballast within said float body for determining an orientation of float body, said ballast being movable between first and second positions near said ends of said float body for initiating tumbling of said float body for reversing said orientation in response to tension on said anchor means produced by a predetermined change in said liquid level;

an attitude sensitive switch within said float body and responsive to said reversing of said orientation of said float body for controlling a level of said liquid.

2. The device according to claim 1, wherein the attitude sensitive switch is a mercury switch.

3. The device according to claim 2, wherein the mercury switch comprises an angled tubular body containing a quantity of mercury, the tubular body having at least one electrode located near one end thereof.

4. The device according to claim 3, wherein the tubular body is electrically conductive which serves as an earth terminal for an electrical current through the switch.

5. The device according to claim 3, wherein an angle of said angled tubular body is substantially 90°.

6. The device according to claim 2, wherein the float body includes an aperture near its one end to provide an access for the electrical cable into the float body, the aperture being sealed off around the cable by means of a molded sealing gland.

7. The device according to claim 2, wherein the elongate flexible anchor means comprises an electrical cable which is connected to the attitude sensitive switch.

8. The device according to claim 7, wherein the float body is formed from a buoyant material defining within the float body an elongate essentially cylindrical chamber for accommodating said movable ballast.

9. The device according to claim 8, wherein the movable ballast comprises a weight in the form of a ball of a material which is relatively more dense than the material of the float body, said ball being at least substantially equal to a weight of the float body.

10. The device according to claim 9, wherein the chamber features constricted retaining sockets at each end thereof which serve to retain the ball stable in one particular socket until the attitude of the float body changes by a predetermined amount.

11. The device according to claim 10, wherein the retaining sockets are adapted to retain the ball stable in its associated socket until the float body is tilted to between 70° and 100° from the vertical.

12. The device according to claim 11, wherein the mercury switch comprises an angled tubular body containing a quantity of mercury, the tubular body having at least one electrode located near one end thereof.

13. The device according to claim 1, wherein the elongate flexible anchor means comprises an electrical cable which is connected to the attitude sensitive switch.

14. The device according to claim 1, wherein the float body is formed from a buoyant material defining within the float body an elongate essentially cylindrical chamber for accommodating said movable ballast.

15. The device according to claim 1, wherein the movable ballast comprises a weight in the form of a ball of a material which is relatively more dense than the material of the float body.

16. The device according to claim 15, wherein the chamber features constricted retaining sockets at each end thereof which serve to retain the ball stable in one particular socket until the attitude of the float body changes by a predetermined amount.

17. The device according to claim 16, wherein the retaining sockets are adapted to retain the ball stable in its associated socket until the float body is tilted to between 70° and 100° from the vertical.

18. The device according to claim 15, wherein the chamber features inwardly projecting annular ridges towards each end thereof which serve to retain the ball stable at one particular end until the attitude of the body changes by a predetermined amount.

19. The device according to claim 18, wherein the annular ridges are adapted to retain the ball stable at its associated end until the float body is tilted to between 70° and 100° from the vertical.

20. The device according to claim 1, further comprising a float attached to said anchor means to compensate for a weight of said anchor means.

21. A method or regulating a liquid level in a vessel comprising:

providing a float body having a first end of an elongate flexible anchor means attached to a first end of said float body, a movable ballast within said float body for determining an orientation of said float body and an attitude sensitive switch within said float body;

attaching a second end of said anchor to a wall of said vessel at a point between a highest and a lowest level of said liquid, said float body being orientated in said liquid with one end being uppermost in said liquid;

changing a level of said liquid;

tensioning said anchor means by a predetermined change in said liquid level for initiating movement of said ballast;

initiating tumbling of said body by said movement of said ballast from a first to a second position near opposite ends of said float body for reversing said orientation;

reversing a state of said attitude sensitive switch for controlling a level of said liquid.

22. Method of claim 21, wherein said anchor is attached to a point midway between said highest and lowest levels.

* * * * *